(12) United States Patent
Sartran et al.

(10) Patent No.: US 10,659,333 B2
(45) Date of Patent: May 19, 2020

(54) DETECTION AND ANALYSIS OF SEASONAL NETWORK PATTERNS FOR ANOMALY DETECTION

(71) Applicant: Cisco Technology, Inc., San Jose, CA (US)

(72) Inventors: Laurent Sartran, Palaiseau (FR); Pierre-André Savalle, Rueil-Malmaison (FR); Jean-Philippe Vasseur, Anchorage, AK (US); Grégory Mermoud, Veyras (CH); Javier Cruz Mota, Assens (CH); Sébastien Gay, Les Rousses (FR)

(73) Assignee: Cisco Technology, Inc., San Jose, CA (US)

( * ) Notice: Subject to any disclaimer, the term of this patent is extended or adjusted under 35 U.S.C. 154(b) by 534 days.

(21) Appl. No.: 15/188,175

(22) Filed: Jun. 21, 2016

(65) Prior Publication Data

US 2017/0279698 A1   Sep. 28, 2017

Related U.S. Application Data

(60) Provisional application No. 62/312,688, filed on Mar. 24, 2016.

(51) Int. Cl.
  *H04L 12/26* (2006.01)
(52) U.S. Cl.
  CPC ...... *H04L 43/0876* (2013.01); *H04L 43/0823* (2013.01); *H04L 43/16* (2013.01)

(58) Field of Classification Search
  USPC ........................................................ 709/224
  See application file for complete search history.

(56) References Cited

U.S. PATENT DOCUMENTS

| 8,554,699 B2 | 10/2013 | Ruhl et al. | |
|---|---|---|---|
| 8,869,276 B2 | 10/2014 | Crovella et al. | |
| 9,288,220 B2 | 3/2016 | Raugas et al. | |
| 2006/0107055 A1* | 5/2006 | Panwar ................. | G06F 21/564 713/176 |
| 2008/0109730 A1* | 5/2008 | Coffman ................ | G06Q 30/02 715/733 |
| 2010/0071061 A1* | 3/2010 | Crovella ............... | H04L 43/022 726/23 |

(Continued)

OTHER PUBLICATIONS

Hyndman et al. "Large-Scale Unusual Time Series Detection" pp. 1-4.

(Continued)

*Primary Examiner* — Philip J Chea
*Assistant Examiner* — Hassan A Khan
(74) *Attorney, Agent, or Firm* — Behmke Innovation Group LLC; James M. Behmke; James J. Wong

(57) ABSTRACT

In one embodiment, a device in a network determines cluster assignments that assign traffic data regarding traffic in the network to activity level clusters based on one or more measures of traffic activity in the traffic data. The device uses the cluster assignments to predict seasonal activity for a particular subset of the traffic in the network. The device determines an activity level for new traffic data regarding the particular subset of traffic in the network. The device detects a network anomaly by comparing the activity level for the new traffic data to the predicted seasonal activity.

20 Claims, 9 Drawing Sheets

(56) References Cited

U.S. PATENT DOCUMENTS

| | | | |
|---|---|---|---|
| 2011/0149745 A1* | 6/2011 | Filho | H04L 63/1416 370/242 |
| 2012/0216282 A1* | 8/2012 | Pappu | H04L 63/1416 726/23 |
| 2015/0101053 A1* | 4/2015 | Sipple | H04L 63/1425 726/24 |
| 2015/0128263 A1* | 5/2015 | Raugas | H04L 63/1408 726/23 |
| 2016/0065604 A1 | 3/2016 | Chen et al. | |
| 2016/0218948 A1* | 7/2016 | Djukic | H04L 43/0876 |

OTHER PUBLICATIONS

Nguyen et al. "Network Traffic Anomalies Detection and Identification with Flow Monitoring" © 2008 IEEE; pp. 1-5.

* cited by examiner

DETECTION AND ANALYSIS OF SEASONAL NETWORK PATTERNS FOR ANOMALY DETECTION

RELATED APPLICATIONS

This application claims priority to U.S. Provisional Application No. 62/312,688, filed Mar. 24, 2016, entitled "DETECTION AND ANALYSIS OF SEASONAL NETWORK PATTERNS FOR ANOMALY DETECTION," by Sartran et al., the contents of which are hereby incorporated by reference.

TECHNICAL FIELD

The present disclosure relates generally to computer networks, and, more particularly, to the detection and analysis of seasonal network patterns for anomaly detection.

BACKGROUND

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model is the behavior of a device (e.g., a host, networking switch, router, etc.) allows for the detection of malware, which is complimentary to the use of firewalls that use static signatures. Observing behavioral changes (e.g., deviation from modeled behavior) using flows records, deep packet inspection, and the like, allows for the detection of an anomaly such as a horizontal movement (e.g., propagation of malware between devices) or an attempt to perform information exfiltration, prompting the system to take remediation actions automatically.

In the context of IBA, seasonality is an important metric, as hosts and/or specific applications for a host on a network may exhibit seasonal behavior. In other words, the behavior may change periodically over a fixed amount of time, such as a few hours, days, weeks, etc. A common example is the case of client workstations on an enterprise network. These devices are typically in use during the day and show an active behavior that can be quantified by metrics such as network traffic (e.g., number of packets, bandwidth used, etc.). During the night, enterprise workstations are also typically idle and exhibit far less activity. In this example, the period of the seasonal pattern is a day, and two regimes are observed: one of high activity during the day and one of low activity during the night.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
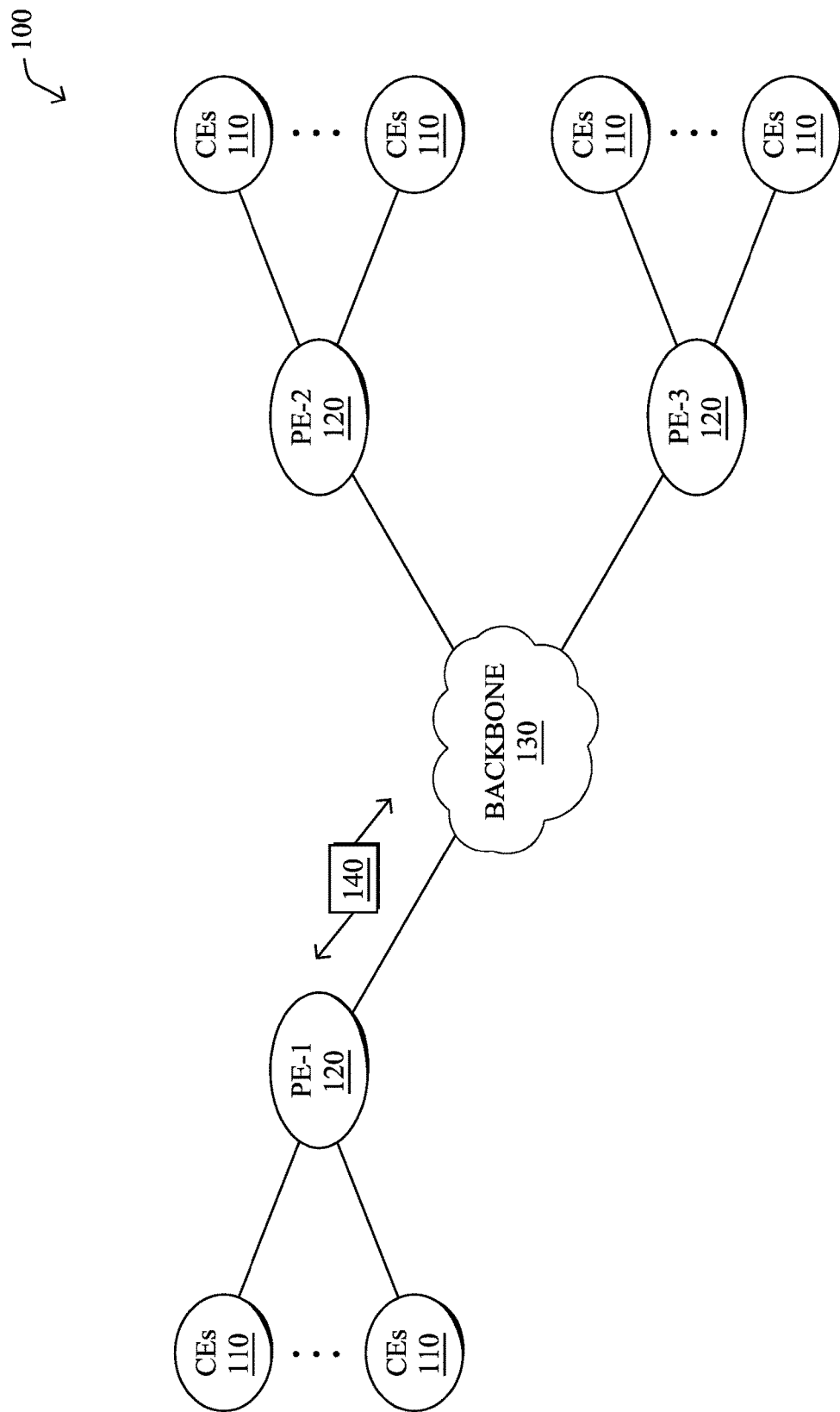
FIGS. 1A-1B illustrate an example communication network.

According to one or more embodiments of the disclosure, a device in a network determines cluster assignments that assign traffic data regarding traffic in the network to activity level clusters based on one or more measures of traffic activity in the traffic data. The device uses the cluster assignments to predict seasonal activity for a particular subset of the traffic in the network. The device determines an activity level for new traffic data regarding the particular subset of traffic in the network. The device detects a network anomaly by comparing the activity level for the new traffic data to the predicted seasonal activity.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
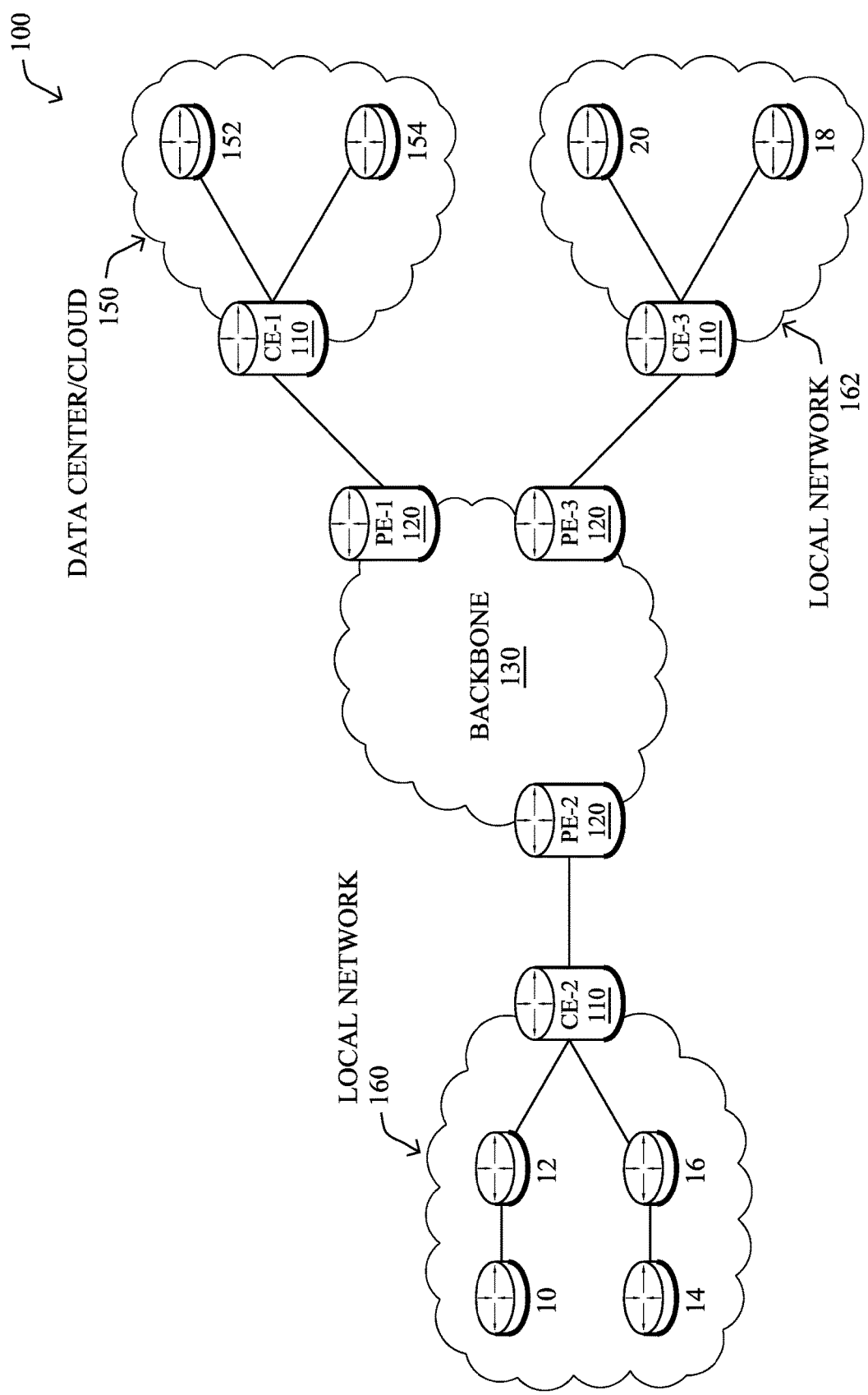

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
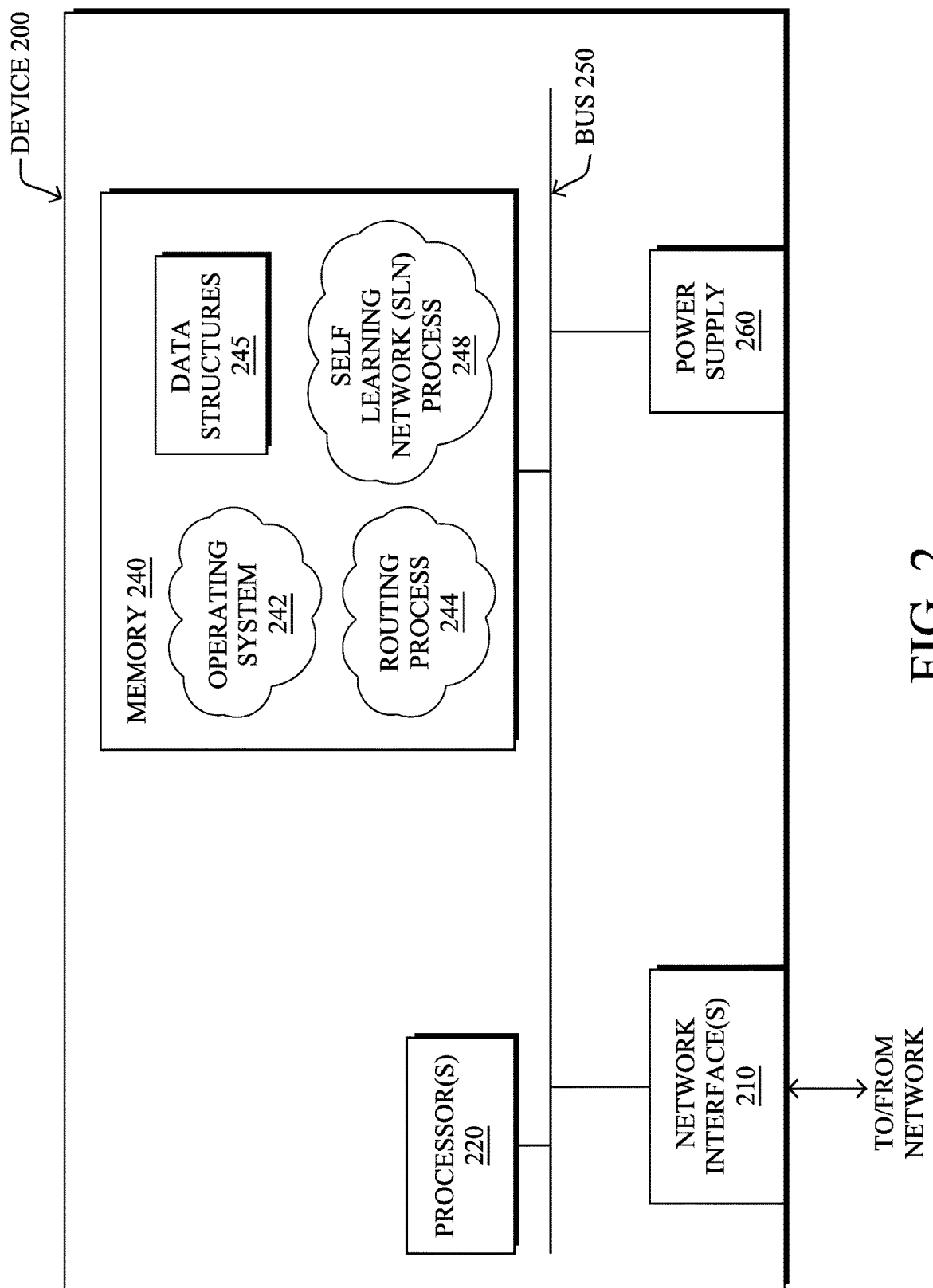
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures)

may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used. SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
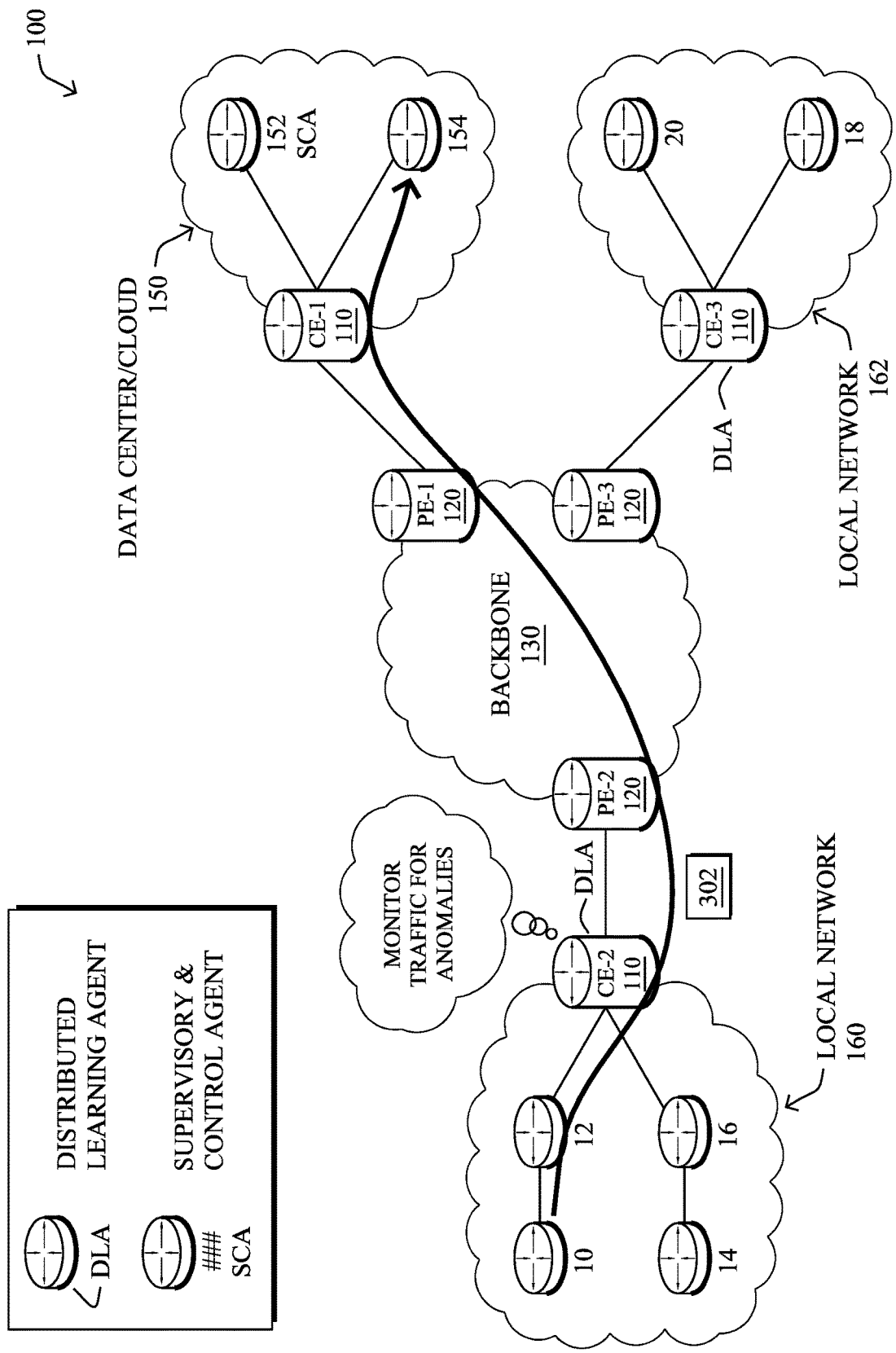
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
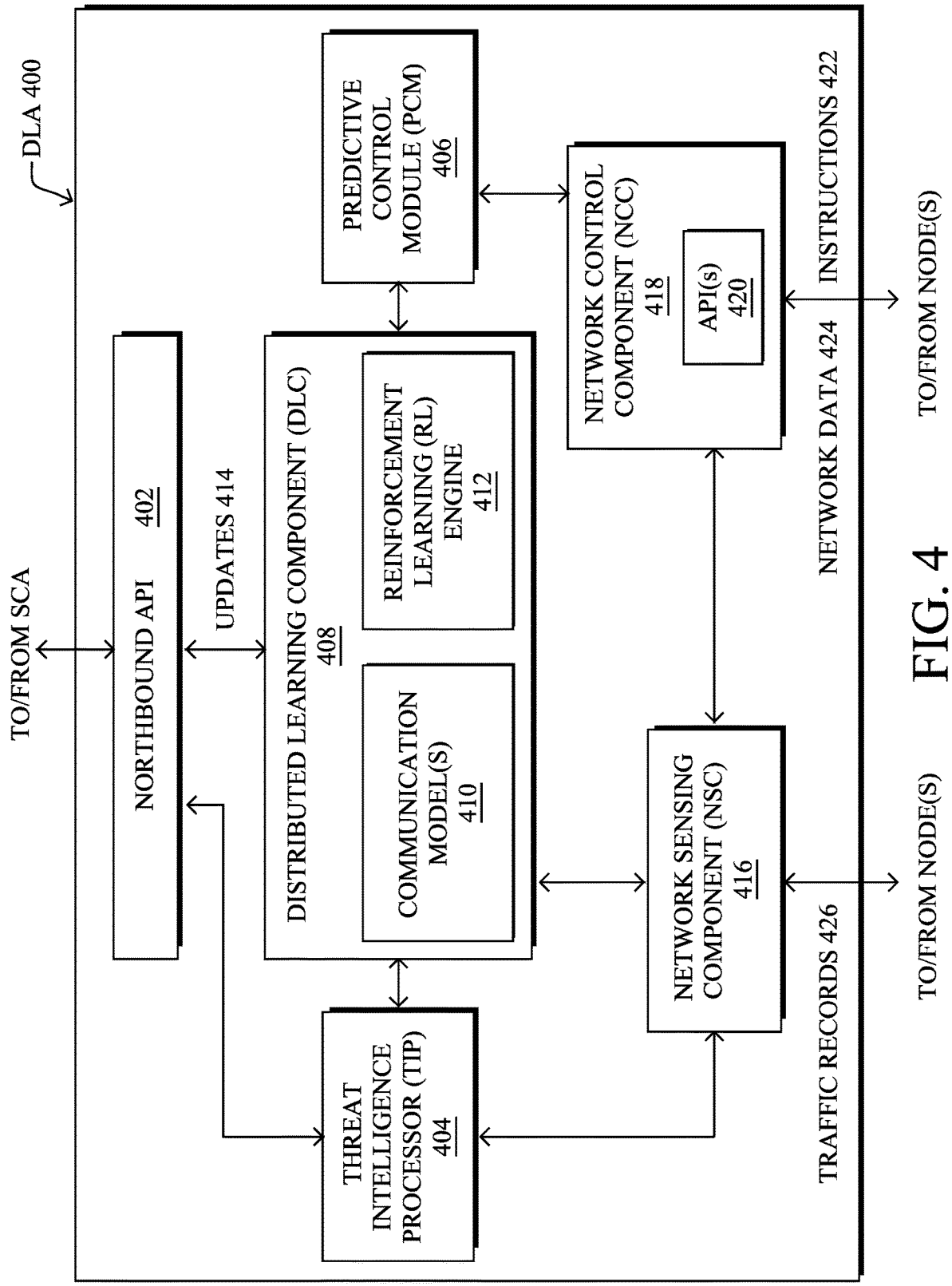
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records or other traffic information, application identification information from a Cisco™ Network Based Application Recognition (NBAR) process or another application-recognition mechanism, administrative information from an administrative reporting tool (ART), local network state information service sets, media metrics, raw packets, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics for use by the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, seasonality may play an important part in IBA and anomaly detection, in general. For example, host devices in a network may exhibit very different daytime and nighttime behaviors. In another example, servers that are used for maintenance tasks, such as backups, may also exhibit seasonal behavior. On the contrary, some hosts may have a continuous pattern of activity, exhibiting no seasonal pattern at all. Formally, a seasonal pattern for a host is a period of time and a partition of that period of time in intervals within which the hosts have a stable behavior. For example, a trading application in the branch office of a bank is expected to be highly seasonal and any deviations from the learned seasonality may be deemed suspicious.

Seasonal patterns, when they are observed, are often driven by stable constraints. Notably, a circadian seasonal pattern is usually driven by the diurnal nature of most human activities. Operational constraints can also explain seasonal patterns. For example, backups may be done at night when networks are idle and started early enough for the backups to have enough time to complete. The stability of the constraints also adds to the stability of the seasonal patterns.

Thus, when learning normal network behaviors, it may also be important to identify and analyze seasonal behavioral patterns, as well.

The fact that seasonal patterns are stable means, by definition, that events that do not match the seasonal patterns are rare. For example, if a seasonal host is usually active only during the day, then it is rare and unexpected to observe activity of the host during the night. When hosts on a network behave in an anomalous fashion, then the existing seasonal patterns may be broken. That is, some behavior may occur at a time when it is not usually observed. When that is the case, it gives a strong signal that the network has deviated from normality. Such events are, therefore, of great interest from a security perspective. For instance, a vulnerable workstation may be used during the night to access other hosts on a network. If it can be assumed that the workstation normally is not active at that time, the raised anomaly event can be brought to the attention of the relevant operators in a Security Operation Center (SOC) (e.g., via an SCA, etc.).

Detection and Analysis of Seasonal Network Patterns for Anomaly Detection

The techniques herein allow for the detection and analysis of patterns that are unusual in view of their seasonality and periodicity. In some aspects, a clustering process can assess network traffic to learn different traffic behaviors and statistical models can predict the occurrence of these behaviors based on temporal and calendar-based features. If the occurrence of a pattern does not match that predicted by the statistical model(s), the system may consider the occurrence unusual and alert a global anomaly detection mechanism.

Of particular note is that the techniques herein demonstrate a willingness to detect anomalies on hosts that follow a seasonal pattern only. That yields a strong set of assumptions that the system can use to perform detections. In some embodiments, the system may use a stack comprising a clustering process, an evaluation metric, a classification process, and a comparison process that compares predicted and observed clusters for seasonal hosts.

Specifically, according to one or more embodiments of the disclosure as described in detail below, a device in a network determines cluster assignments that assign traffic data regarding traffic in the network to activity level clusters based on one or more measures of traffic activity in the traffic data. The device uses the cluster assignments to predict seasonal activity for a particular subset of the traffic in the network. The device determines an activity level for new traffic data regarding the particular subset of traffic in the network. The device detects a network anomaly by comparing the activity level for the new traffic data to the predicted seasonal activity.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein.

Operationally, the techniques herein provide for a system that is distributed across the network, and is located on various privileged points, such as routers where models are computed (e.g., DLAs). These devices may execute a component that collects information about the network traffic, either directly or using aggregated records such as NetFlow reports. As input, the device may receive frequent updates regarding network attributes and metrics, including, e.g., source, destination, application, number of bytes received or sent, number of packets received or sent. The device uses this data to compute features, which are a set of metrics that quantify the behavior of a host. An exemplary setting for such a device is the SLN architecture described above.

Figure 5:
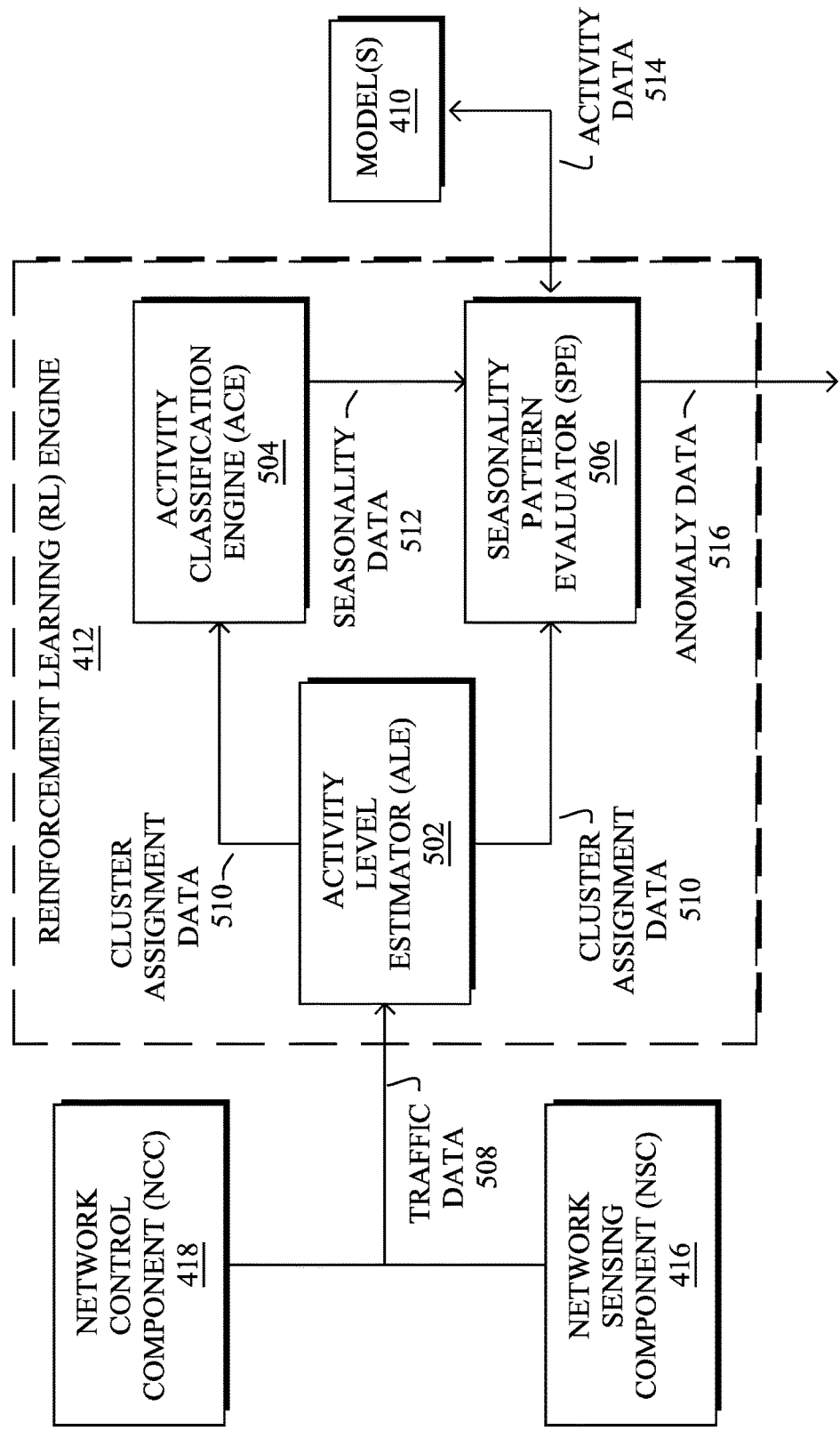
FIG. 5 illustrates an example architecture for using seasonal network patterns to detect network anomalies.

FIG. 5 illustrates an example architecture for using seasonal network patterns to detect network anomalies. In particular, DLC 408 of a DLA 400 is shown in greater detail, according to various embodiments. As described above, the host device (e.g., an edge router, switch, etc.) may execute an NSC 416 and/or NCC 418 that are configured to collect and assess traffic data 508 regarding traffic in the network. For example, traffic data 508 may include the traffic records 426 and/or network data 424 described previously with respect to DLA 400, or any other data regarding network traffic collected by another component or device. Based on the received traffic data 508, DLC 408 may determine whether a network anomaly exists by assessing individual traffic flows and/or traffic flows in the aggregate (e.g., for a cluster of host devices, flows associated with the same application, etc.). In particular, DLC 408 may construct any number of models 410 using RL engine 412, which may be configured to further assess the seasonality of the traffic flows.

In some embodiments, RL engine 412 may include an activity level estimator (ALE) module 502. As shown, ALE 502 may be co-located on the DLA and receives traffic data 508 as input, using features computed on segmentations of the network traffic. Traffic data 508 can be segmented in any number of different ways. For example, traffic data 508 can be segmented by host pairs, communications per application, the communications per application per pair of hosts, etc.

In some embodiments, ALE 502 may apply a clustering process to the received traffic data features, to discern the different levels of activity. For example, ALE 502 may classify the traffic segments as exhibiting either "low activity" or "high activity." In another example, ALE 502 may classify the traffic segments into the following activity level clusters: "low activity," "normal activity," and "high activity." The number of estimated levels can be a configuration parameter of be dynamically learned by ALE 502 itself.

For example, ALE 502 may receive for each time interval a list of pairs of hosts, (or pairs of hosts per application, or applications, etc.) and associated feature vectors quantifying the traffic patterns between these two hosts. Said differently, the input feature vector classified by ALE 502 may include one or more measures of traffic activity of the traffic flow(s). Such a feature vector may include, but is not restricted to, the number of bytes, or the number of packets exchanged between the two hosts of the traffic flow, etc. In turn, for each host, ALE 502 may accumulate over a fixed time window (e.g. a few weeks) all of the feature vectors that it receives.

After accumulating the feature vectors, ALE 502 then groups these feature vectors into clusters according to their values. Various methods can be used, including k-means, DBSCAN, or mixture models. The number of clusters can be either predefined, user-defined, or determined by the clustering step itself. Clustering may be done in single dimensional space (one independent model for each feature) or in multidimensional space (taking into account potential correlations between different features). In some cases, the goal of this clustering step is to discretize the value-space of the features of these pairs of hosts into a small number of main regimes, like low/medium/high. Seasonal hosts often exhibit a clear separation of these regimes, which makes this clustering step all the more relevant. The main goal of this discretization is to simplify the regression problem, as described in greater detail below.

In some cases, ALE 502 may evaluate the result of the clustering operation by computing a quality metric for the clustering, such as the silhouette, or the distortion value, using subsampling, and/or bootstrapping for efficiency. If the quality metric exceeds a predefined threshold, then the feature vectors associated with the host are considered to obey a multimodal distribution, and they are passed to the classification engine. If the quality metric does not meet the predefined threshold, then the feature vectors are considered to be unimodal and the corresponding host is not considered to obey a seasonality pattern. Note that such an approach allows for the exclusion of host and applications that do not exhibit a seasonal profile, in contrast to other seasonality approaches. At each step, the model selects the candidates for which a seasonal behavior is indeed detected without requiring a manual selection of such candidates.

Another aspect of the techniques herein provides for an activity classification engine (ACE) 504 (e.g., as part of RL engine 412). Generally, ACE 504 is a ML module in charge of classifying samples into their corresponding activity level and is typically based on regression methods, although other classification methods can also be used.

ACE 504 may receive as input, for each sample, the cluster assignment data 510 generated by ALE 502. In some embodiments, cluster assignment data 510 may include the cluster assignment vector (e.g., the cluster assignment of each feature of the previously described feature vector used as input to ALE 502), as well as a set of time based indicator features describing the point in time corresponding to the sample. Such time based features may include various parameters regarding the temporal characteristics of the sample. For instance, a parameter, "is_day_1," may take the value '1,' if the timestamp of the sample corresponds to a Monday. In another example, the parameter, "is_hour_7" may be set to a value of '1' if the sample was obtained between 7:00 and 7:59 A.M. Again, this discretization of the time simplifies the extraction of seasonal patterns through regression methods.

The input X of the regression (independent variables), are those features extracted from the time intervals corresponding to each sample and the output Y, or dependent variables, are an encoding of the clusters assignments. The (X,Y) samples may be passed to a logistic regression, or any kind of similar classification process, to estimate parameters that explain the clusters assignments Y through a function f of the time based features X. Y', clusters assignments computed by the model, as Y'=f(X), are compared to the true clusters assignments (e.g., provided by ALE 502). When the difference between Y and Y', as computed by a loss function, is below a predefined threshold, ACE 504 may consider the host associated with the samples to obey a seasonal pattern. The evaluation of the difference between Y and Y' allows for determining which host/applications are indeed showing a seasonal behavior. When the difference is above the predefined threshold P, then, although the distribution of samples is multimodal, the host does not obey a seasonal pattern.

In yet another embodiment, a central controller (e.g., the SCA) may dynamically adjust the predefined threshold P of ACE 504, according to the rate of false positives for the related anomalies. Indeed, a high rate of false positives may be reduced by modifying the value of P accordingly, making the choice of seasonal traffic to predict limited to host/ application where seasonality can be modeled with high fidelity.

As noted, ALE 502 and ACE 504 may operate in conjunction to exclude hosts or clusters of hosts that do not exhibit seasonal traffic patterns. In particular, ALE 502 may identify host(s) that are unimodal and only exhibit one class of traffic activity. For example, if a particular host always exhibits a low degree of activity, the DLA may determine that the host does not exhibit seasonal behavior and exclude the host from further seasonal analysis. In addition, even if the host(s) exhibit multimodal traffic activity, ACE 504 may determine, nonetheless, that the exhibited behavior of the host(s) is not seasonal, based on the regression analysis.

A further aspect of the techniques herein introduces a seasonality pattern evaluator (SPE) 506 that may be co-located on the DLA (e.g., as part of RL engine 412, etc. In general, SPE 506 may perform any or all of the following operations:

1.) Associate the most recent feature vectors for hosts that obey seasonal patterns with the clusters to which they belong (e.g., based on cluster assignment data 510 provided by ALE 502), 2.) Get the predicted activity level (e.g., from the seasonality data 512 generated by ACE 504), 3.) Store the information about actual and predicted level of activity (e.g., by storing activity data 514 in models 410, etc.).

When the predicted activity and the actual activity do not match for a period of time that exceeds a predefined threshold, SPE 506 may deem the behavior of the host as anomalous. In turn, SPE 506 may generate anomaly data 516 that is passed to an anomaly management component for further processing. For example, DLC 408 may send anomaly data 516 to the SCA for remote processing, to TIP 404 and/or PCM 406 for local processing, etc. For example, the SCA may use anomaly data 516 to notify the relevant operator as to the anomaly, so that mitigation steps can possibly be undertaken.

In another embodiment, the SCA may dynamically adjust the threshold for the time period discrepancy assessed by SPE 506 to detect anomalies, so that SCA can fine tune the number of false positives, similar to the feedback mechanism described with respect to ACE 504.

Figure 6A:
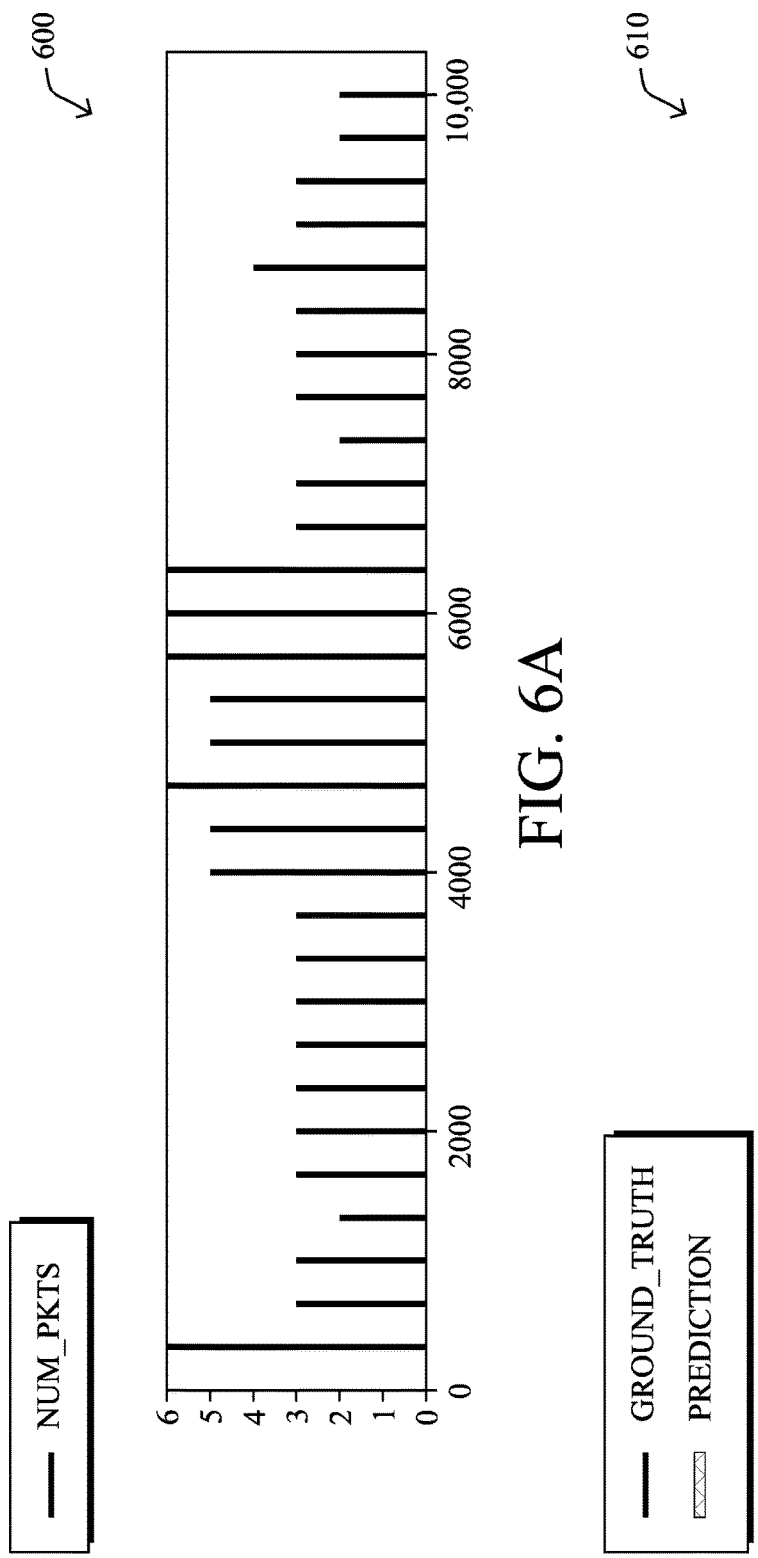
FIGS. 6A-6B illustrate a comparison of observed packets, cluster assignments, and predictions.
Figure 6B:
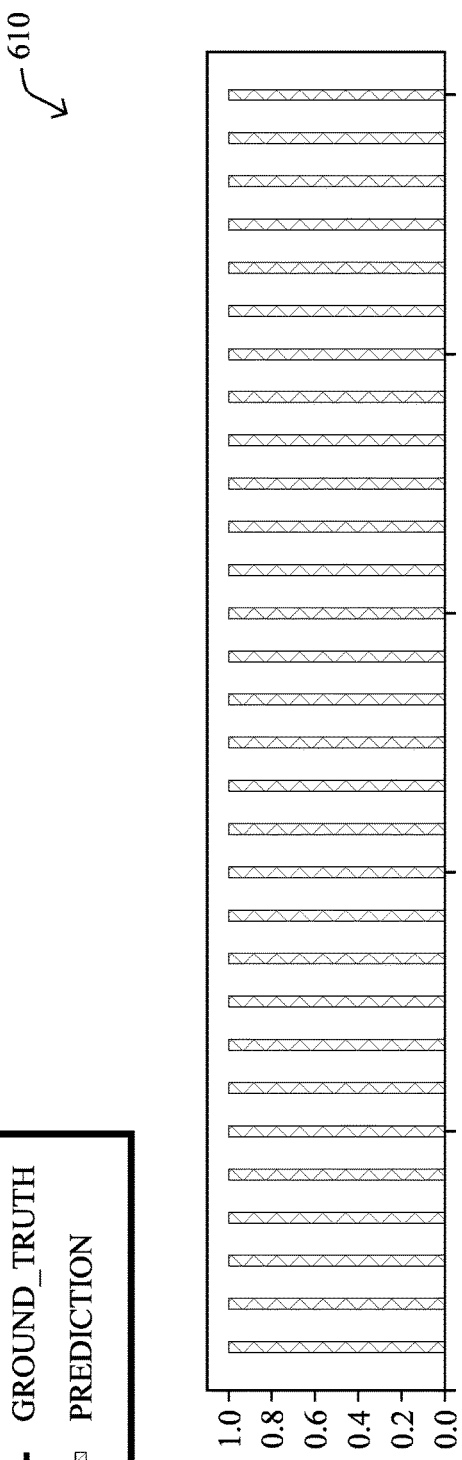

FIGS. 6A-6B illustrate a comparison of observed packets, cluster assignments, and predictions. As shown in FIG. 6A, plot 600 illustrates a plot of the observed number of packets between two network hosts over the course of time. As would be appreciated, any number of different measures of traffic activity can be assessed, such as the observed number of bytes in the traffic, the number of individual traffic flows between the two hosts, etc.

FIG. 6B illustrates the plot 610 of the cluster assignment ground truth and cluster assignment predictions that correspond to the behavior shown in plot 600. Here, the pattern is almost perfectly periodic with two very distinct regimes: one low activity classification where there is no traffic and one high activity classification in which there is traffic between the hosts. The prediction matches the ground truth perfectly, meaning that these seasonality model is able to discern anomalies (e.g., if traffic is observed at an unusual time in view of the model).

Figure 7A:
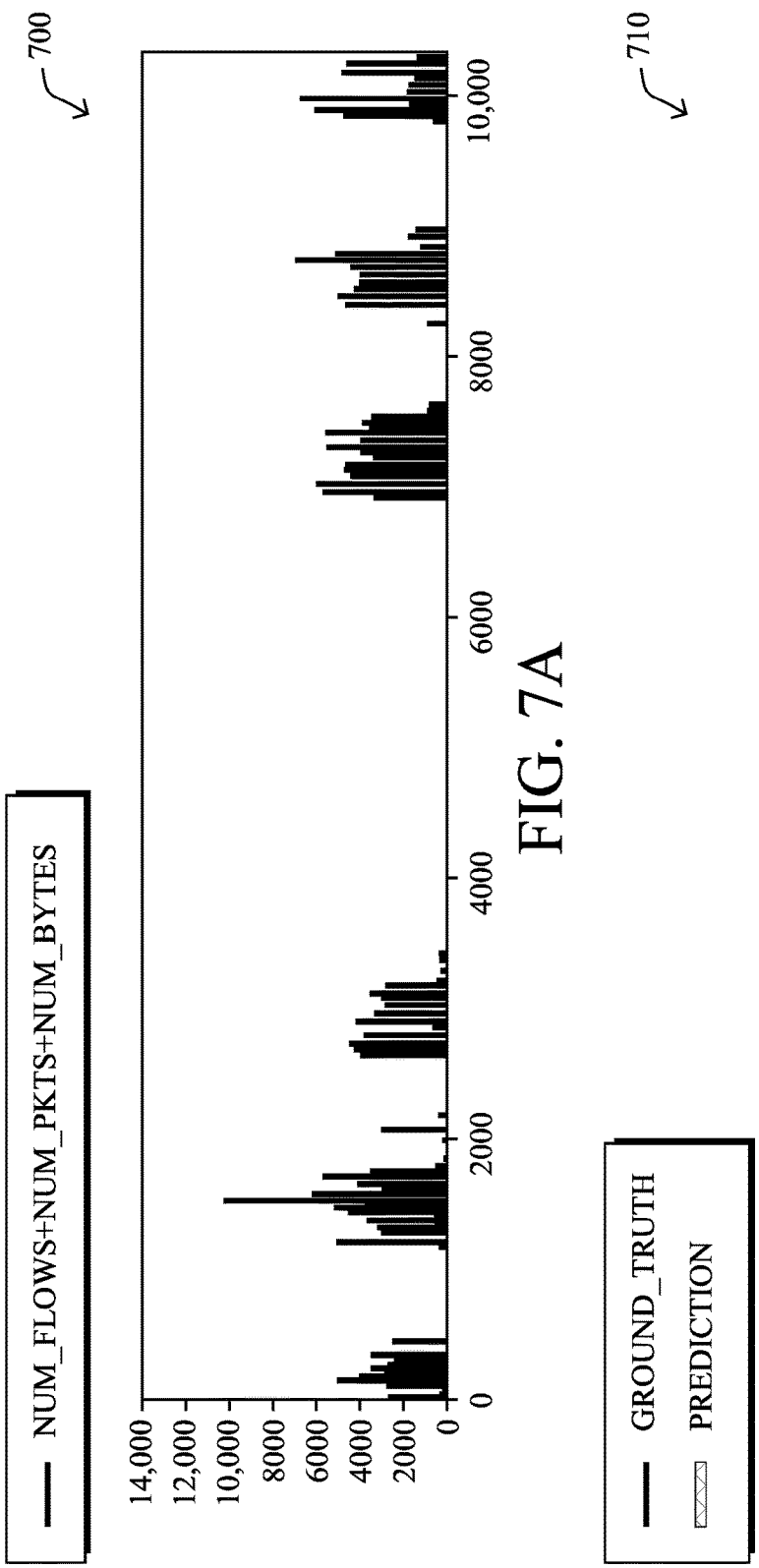
FIGS. 7A-7B illustrate a comparison of day and night patterns of a host.
Figure 7B:
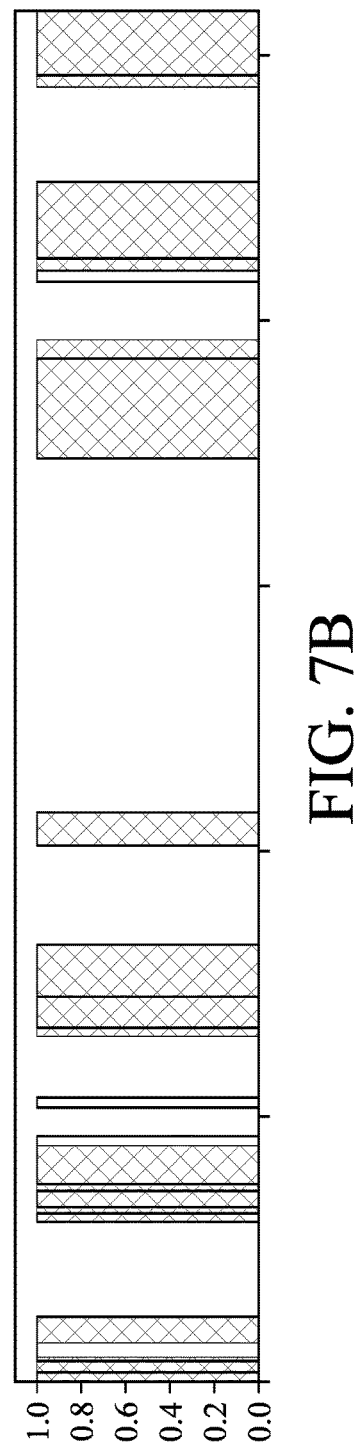

FIGS. 7A-7B illustrate a comparison of day and night patterns of a host, according to another example. As shown in FIG. 7A, plot 700 depicts an example of another measure of traffic activity between two hosts, which may be calculated as the sum of traffic flows, packets, and bytes over time. From plot 700, it can be seen that the hosts exhibit typical day-night patterns where traffic activity occurs during the day and is either low or non-existent at night. Plot 700 also demonstrates less defined boundaries between these high and low regimes than that of plot 600 in FIG. 6A.

FIG. 7B illustrates a plot 710 of the ground truth classifications vs. the predicted classifications over time, given the behavior shown in plot 700. As shown, the prediction by the DLA matches the ground truth much less than in the case of FIGS. 6A-6B. In particular, since there is no traffic for approximately two days in the middle of plot 700 (e.g., a weekend), the classification process may become confused. The system will have to be trained for a longer period of time to learn this weekday/weekend traffic pattern differences.

Figure 8:
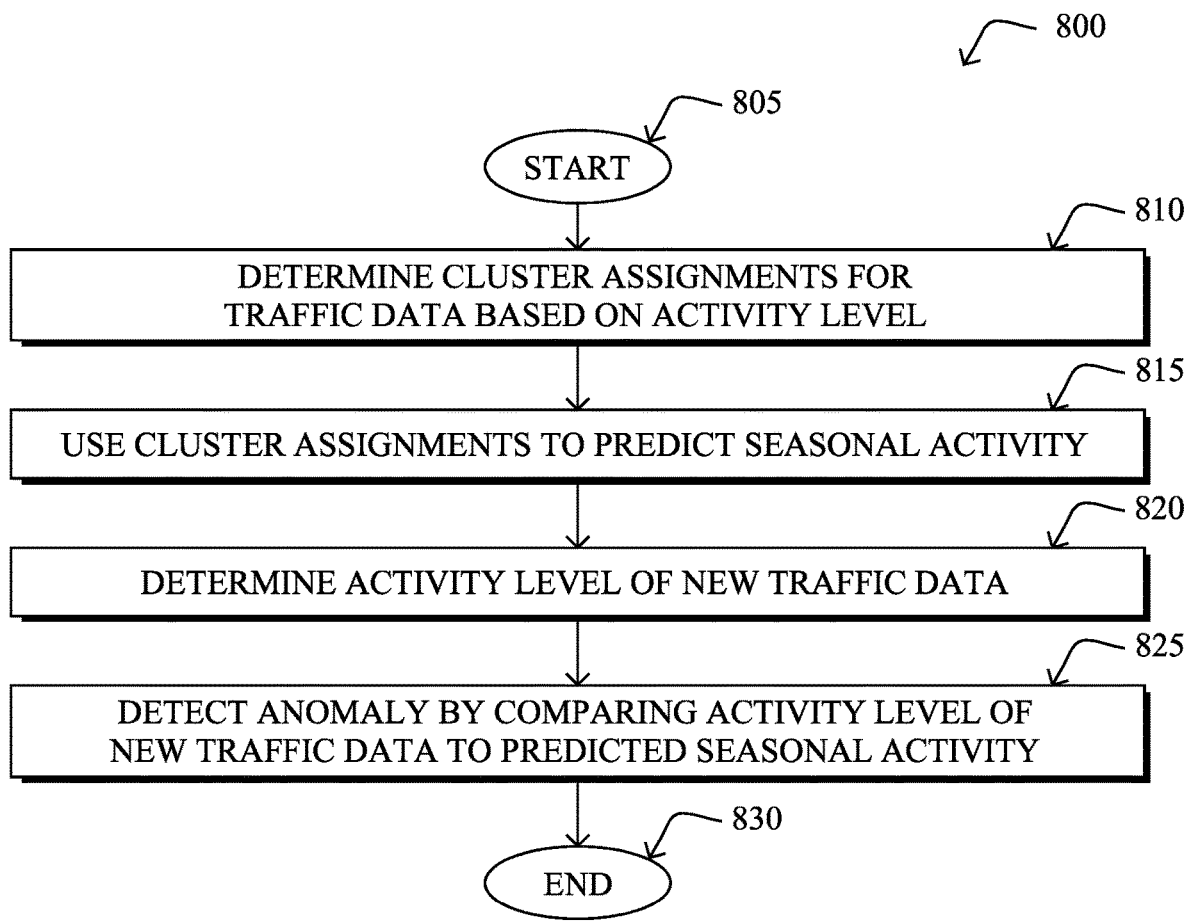
FIG. 8 illustrates an example simplified procedure for detecting a network anomaly using seasonal network patterns.

FIG. 8 illustrates an example simplified procedure for detecting a network anomaly using seasonal network patterns, in accordance with various embodiments herein. In general, procedure 800 may be executed by a device in a network (e.g., device 200), such as a DLA/edge router or other device in the network. Procedure 800 may start at step 805 and continues on to step 810 where, as described in greater detail above, the device may determine cluster assignments that assign traffic data regarding traffic in the network to activity level clusters. Such traffic data may include, but is not limited to, information regarding the host(s) associated with the various traffic flows in the network (e.g., address, port, etc.), temporal information regarding the flows, packet counts, byte counts, application information, or any other information regarding the traffic. The device may subdivide the traffic data along any of these lines or combinations thereof (e.g., traffic for a particular application between two specific hosts, etc.). The device may then use one or more measures of traffic activity (e.g., byte count, packet count, etc.) over discrete time intervals, to determine the cluster assignments. For example, the device may determine whether traffic between two particular hosts represents "high activity," "low activity," etc.

At step 815, as detailed above, the device may use the cluster assignments to predict seasonal activity. In some embodiments, the device may employ a classification process using the cluster assignments, to predict seasonal activity. For example, the device may use regression (e.g., logistic regression, etc.), to model how the traffic data is assigned to the various activity clusters. In some cases, the device may determine a difference between the classified set of samples and the corresponding cluster assignments for the classified set of samples, to determine whether the difference is below a predefined threshold. If so, the device may deem the corresponding host(s) as exhibiting seasonal traffic behavior.

At step 820, the device may determine an activity level for new traffic data regarding the particular subset of traffic in the network, as described in greater detail above. For example, assume that the device assessed a history of traffic data between two hosts (e.g., by performing steps 810-815). At some point in the future, the device may receive additional traffic data regarding a new traffic flow between the two hosts. In turn, the device may attempt to determine whether the new traffic flow is exhibiting behavior corresponding to "high activity," "low activity," etc.

At step 825, as detailed above, the device may detect an anomaly by comparing the activity level for the new traffic data to the predicted seasonal activity. For example, if the predicted seasonality of the host's traffic activity is "low activity" and the new traffic data indicates "high activity," the device may deem this behavior to be anomalous. In turn, the device may take any number of measures, such as generating an anomaly alert, taking proactive measures (e.g., by dropping traffic, blocking traffic, etc.), or the like. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, rely on deep, stable properties of the network, e.g., the seasonal behavior of certain hosts. Thus, the techniques herein may look for deviations from a restrained set of pairs of hosts displaying very seasonal traffic patterns, yielding a very strong signal when such deviations are found. In addition, the techniques also introduce functionality whereby inputs that are not considered seasonal are not assessed for seasonality-related anomalies.

While there have been shown and described illustrative embodiments that provide for the detection and analysis of seasonal device behavior, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a device in a network, cluster assignments that assign traffic data regarding traffic in the network to activity level clusters based on one or more measures of traffic activity in the traffic data, wherein the activity level clusters are representative of levels of activity between particular hosts in the network;
    using, by the device, the cluster assignments to predict seasonal activity for a particular subset of the traffic in the network by using a machine learning-based (ML-based) classification function that models how a plurality of samples of traffic data of the network is assigned to the levels of activity between the particular hosts in the network using at least one regression, wherein the predicted seasonal activity is based on a plurality of intervals of periods of time indicative of stable behavior in the particular subset of traffic;
    determining, by the device, an activity level for new traffic data regarding the particular subset of traffic in the network; and
    detecting, by the device, a network anomaly by comparing the activity level for the new traffic data to the predicted seasonal activity.

2. The method as in claim 1, wherein using the cluster assignments to predict seasonal activity for the particular subset of traffic in the network comprises:
    generating, by the device, the ML-based classification function; and using the ML-based classification function to determine whether samples for the particular subset of traffic in the network exhibit a seasonal pattern.

3. The method as in claim 2, wherein generating the ML-based classification function comprises:
performing, by the device, regression on the cluster assignments and the plurality of samples in the traffic data over a set of time intervals.

4. The method as in claim 2, wherein using the ML-based classification function to determine whether samples for the particular subset of traffic in the network exhibit a seasonal pattern comprises:
using, by the device, the ML-based classification function to classify a set of samples for the particular subset of traffic according to their activity levels; and
determining, by the device, that the set of samples exhibit a seasonal pattern based on a difference between the classified set of samples and the corresponding cluster assignments for the classified set of samples being below a predefined threshold.

5. The method as in claim 4, further comprising:
adjusting, by the device, the predefined threshold based on feedback regarding network anomalies detected by the device.

6. The method as in claim 1, wherein the particular subset of the traffic is associated with a particular host node in the network, and wherein the one or more measures of traffic activity in the traffic data comprise a number of packets or bytes of traffic associated with the host node.

7. The method as in claim 1, further comprising:
evaluating, by the device, a quality metric associated with one of the cluster assignments to determine whether the traffic data associated with the cluster assignment is unimodal; and, in response,
determining, by the device, that the traffic data associated with the cluster assignment is not seasonal.

8. The method as in claim 1, wherein the activity level clusters comprise a low activity cluster and a high activity cluster.

9. The method as in claim 1, wherein the device is an edge router.

10. An apparatus, comprising:
one or more network interfaces to communicate with a network;
a processor coupled to the network interfaces and configured to execute one or more processes; and
a memory configured to store a process executable by the processor, the process when executed configured to:
determine cluster assignments that assign traffic data regarding traffic in the network to activity level clusters based on one or more measures of traffic activity in the traffic data, wherein the activity level clusters are representative of levels of activity between particular hosts in the network;
use the cluster assignments to predict seasonal activity for a particular subset of the traffic in the network by using a machine learning-based (ML-based) classification function that models how a plurality of samples of traffic data of the network is assigned to the levels of activity between the particular hosts in the network using at least one regression, wherein the predicted seasonal activity is based on a plurality of intervals of periods of time indicative of stable behavior in the particular subset of traffic;
determine an activity level for new traffic data regarding the particular subset of traffic in the network; and
detect a network anomaly by comparing the activity level for the new traffic data to the predicted seasonal activity.

11. The apparatus as in claim 10, wherein the apparatus uses the cluster assignments to predict seasonal activity for the particular subset of traffic in the network by:
generating the ML-based classification function; and
using the ML-based classification function to determine whether samples for the particular subset of traffic in the network exhibit a seasonal pattern.

12. The apparatus as in claim 11, wherein the apparatus generates the ML-based classification function by performing regression on the cluster assignments and the plurality of samples in the traffic data over a set of time intervals.

13. The apparatus as in claim 11, wherein the apparatus uses the ML-based classification function to determine whether samples for the particular subset of traffic in the network exhibit a seasonal pattern by:
using the ML-based classification function to classify a set of samples for the particular subset of traffic according to their activity levels; and
determining that the set of samples exhibit a seasonal pattern based on a difference between the classified set of samples and the corresponding cluster assignments for the classified set of samples being below a predefined threshold.

14. The apparatus as in claim 13, wherein the process when executed is further operable to:
adjust the predefined threshold based on feedback regarding network anomalies detected by the apparatus.

15. The apparatus as in claim 10, wherein the particular subset of the traffic is associated with a particular host node in the network, and wherein the one or more measures of traffic activity in the traffic data comprise a number of packets or bytes of traffic associated with the host node.

16. The apparatus as in claim 10, wherein the process when executed is further operable to:
evaluate a quality metric associated with one of the cluster assignments to determine whether the traffic data associated with the cluster assignment is unimodal; and, in response,
determine that the traffic data associated with the cluster assignment is not seasonal.

17. The apparatus as in claim 10, wherein the activity level clusters comprise a low activity cluster and a high activity cluster.

18. The apparatus as in claim 10, wherein the apparatus is an edge router.

19. A tangible, non-transitory, computer-readable medium storing program instructions that cause a device in a network to execute a process comprising:
determining cluster assignments that assign traffic data regarding traffic in the network to activity level clusters based on one or more measures of traffic activity in the traffic data, wherein the activity level clusters are representative of levels of activity between particular hosts in the network;
using the cluster assignments to predict seasonal activity for a particular subset of the traffic in the network by implementing a machine learning-based (ML-based) classification function that models how a plurality of samples of traffic data of the network is assigned to the levels of activity between the particular hosts in the network using at least one regression, wherein the predicted seasonal activity is based on a plurality of intervals of periods of time indicative of stable behavior in the particular subset of traffic;

determining an activity level for new traffic data regarding the particular subset of traffic in the network; and detecting a network anomaly by comparing the activity level for the new traffic data to the predicted seasonal activity.

20. The tangible, non-transitory, computer-readable medium as in claim 19, wherein using the cluster assignments to predict seasonal activity for the particular subset of traffic in the network comprises:

generating the ML-based classification function; and using the ML-based classification function to determine whether samples for the particular subset of traffic in the network exhibit a seasonal pattern.

* * * * *